(12) United States Patent
Suzuki

(10) Patent No.: US 9,952,420 B2
(45) Date of Patent: Apr. 24, 2018

(54) IMAGE OBTAINING APPARATUS AND STAGE CONTROL METHOD

(71) Applicant: Sony Corporation, Tokyo (JP)

(72) Inventor: Fumiyasu Suzuki, Saitama (JP)

(73) Assignee: Sony Corporation, Tokyo (JP)

( * ) Notice: Subject to any disclaimer, the term of this patent is extended or adjusted under 35 U.S.C. 154(b) by 381 days.

(21) Appl. No.: 14/168,883

(22) Filed: Jan. 30, 2014

(65) Prior Publication Data

US 2014/0218499 A1    Aug. 7, 2014

(30) Foreign Application Priority Data

Feb. 7, 2013    (JP) ................. 2013-022255

(51) Int. Cl.
```
H04N 9/47       (2006.01)
H04N 7/18       (2006.01)
G05B 19/40      (2006.01)
H02P 8/00       (2006.01)
G02B 21/26      (2006.01)
G02B 21/36      (2006.01)
G05B 19/10      (2006.01)
H02P 8/14       (2006.01)
```
(52) U.S. Cl.
CPC ........... *G02B 21/26* (2013.01); *G02B 21/362* (2013.01); *G05B 19/10* (2013.01); *H02P 8/14* (2013.01)

(58) Field of Classification Search
CPC .................................................. G02B 21/362
USPC ......................................................... 348/79
See application file for complete search history.

(56) References Cited

U.S. PATENT DOCUMENTS

| | | | | |
|---|---|---|---|---|
| 7,538,815 B1* | 5/2009 | Belikov | ................ | G02B 7/36 348/345 |
| 2003/0019310 A1* | 1/2003 | Hasegawa | ............ | G02B 21/26 74/89.22 |
| 2010/0235955 A1* | 9/2010 | Humphris | ............ | B82Y 35/00 850/6 |

FOREIGN PATENT DOCUMENTS

| | | | |
|---|---|---|---|
| JP | 2002-126964 A | | 5/2002 |
| JP | 2007-80660 A | | 3/2007 |
| JP | 2010-039004 | * | 2/2010 ............ G03F 7/20 |
| JP | 2010-39004 A | | 2/2010 |

* cited by examiner

*Primary Examiner* — Jorge L Ortiz Criado
*Assistant Examiner* — Boubacar Abdou Tchoussou
(74) *Attorney, Agent, or Firm* — Sheridan Ross. P.C.

(57) ABSTRACT

An image obtaining apparatus includes an image pickup unit, a stage, a connection unit, a movement mechanism, a position detection unit, and a control unit. The image pickup unit includes an objective lens. The stage is configured to determine a position of a pathology slide in an optical axis direction of the objective lens, and the pathology slide is an image pickup target of the image pickup unit. The connection unit is provided to the stage. The movement mechanism is connected to the stage through the connection unit and configured to move the stage in the optical axis direction. The position detection unit is configured to detect a position of the stage in the optical axis direction for a measurement point preset on the stage. The control unit is configured to control the movement mechanism by using at least a result of the detection by the position detection unit.

5 Claims, 12 Drawing Sheets

(2pulses, 10ms)
(4pulses, 7ms)
(5pulses, 5ms)
(10pulses, 3ms)
(10pulses, 3ms)
...
(10pulses, 3ms)
(5pulses, 5ms)
(4pulses, 7ms)
(2pulses, 10ms)
end

IMAGE OBTAINING APPARATUS AND STAGE CONTROL METHOD

CROSS REFERENCE TO RELATED APPLICATIONS

This application claims the benefit of Japanese Priority Patent Application JP 2013-022255 filed Feb. 7, 2013, the entire contents of which are incorporated herein by reference.

BACKGROUND

The present technology relates to control for a stage on which a pathology slide is placed in a digital microscope apparatus.

In a digital microscope apparatus, when an image of a sample on a pathology slide is taken, a stage on which the pathology slide is placed is moved in an X-axis direction and a Y-axis direction in order to take an image of a desired position. Further, the stage is moved in a Z-axis direction to perform focusing.

To accurately move a stage to a desired position, positioning control is important. To accurately grasp the position of a stage, for example, a linear encoder or a rotary encoder is used. Further, to control a servo motor, a stepping motor, a linear motor, or the like for driving a stage, various devices are used.

For example, Japanese Patent Application Laid-open No. 2002-126964 discloses such a technology that a servo motor that drives a stage is controlled by feeding back information from a position sensor and a current detection unit.

Further, Japanese Patent Application Laid-open No. 2007-80660 discloses such a technology that open-loop control is performed for a stepping motor that drives a stage.

Further, Japanese Patent Application Laid-open No. 2010-39004 discloses such a technology that a linear motor that drives a stage is controlled by a two degree-of-freedom control system constituted of feed-forward control and feed-back control.

SUMMARY

In the stage drive control that uses the stepping motor in related art, optimization of an attachment position of a linear encoder and optimization of positioning control for moving a stage at a high velocity with high accuracy are insufficient.

In view of the above-mentioned circumstances, it is desirable to provide an image obtaining apparatus and a stage control method capable of optimizing movement of a stage.

According to an embodiment of the present technology, there is provided an image obtaining apparatus including an image pickup unit including an objective lens, a stage, a connection unit provided to the stage, a position detection unit, and a control unit. The stage is configured to determine a position of a pathology slide in an optical axis direction of the objective lens, and the pathology slide is an image pickup target of the image pickup unit. The movement mechanism is connected to the stage through the connection unit and configured to move the stage in the optical axis direction. The position detection unit is configured to detect a position of the stage in the optical axis direction for a measurement point preset on the stage. The control unit is configured to control the movement mechanism by using at least a result of the detection by the position detection unit.

In the present technology, when the stage (Z stage) is moved, the position of the Z stage in the optical axis direction is detected not on the connection unit that connects the Z stage with the movement mechanism but on the measurement points provided to the Z stage. Therefore, it is possible to detect the position of the stage with high accuracy and optimize the movement of the stage.

In the image obtaining apparatus in the embodiment of the present technology, the connection unit may be protruded from the stage in the optical axis direction.

In the image obtaining apparatus in the embodiment of the present technology, the movement mechanism may include a stepping motor, and the control unit may include a position calculation unit configured to calculate a movement target position for each unit time as a series, which is shorter than a time period necessary to move the stage to an image pickup position where an image of the pathology slide is taken, a difference calculation unit configured to calculate a difference between the movement target position and the position detected by the position detection unit for each the unit time, and a conversion unit configured to convert the difference to a control amount of the stepping motor.

In the present technology, the movement target position is determined for each very short unit time (for example, 1 ms), and the position of the Z stage is detected without a stabilization time period, instead of spending time (for example, 100 ms) to move the Z stage to an image pickup position and feeding back the detected position of the Z stage after waiting for a stabilization time period (for example, 30 ms). As a result, it is possible to shorten a control time period for moving the stage and optimize the movement of the stage.

In the image obtaining apparatus in the embodiment of the present technology, the movement mechanism may include a stepping motor, and the control unit may include a position calculation unit configured to calculate a movement target position for each unit time as a series, which is shorter than a time period necessary to move the stage to an image pickup position where an image of the pathology slide is taken, a first difference calculation unit configured to calculate, as a first difference, a difference between the movement target position and the movement target position in the unit time of a preceding period for each the unit time, a first conversion unit configured to convert the first difference to a first control amount of the stepping motor, a second difference calculation unit configured to calculate, as a second difference, a difference between the movement target position in the unit time n periods (n: predetermined positive integer) before and the position detected by the position detection unit for each the unit time, a second conversion unit configured to convert the second difference to a second control amount of the stepping motor, and a synthesis unit configured to synthesize the first control amount and the second control amount to output a synthesized control amount to the movement mechanism.

In the present technology, the movement target position is determined for each very short unit time (for example, 1 ms), and the position of the Z stage is detected without a stabilization time period, instead of spending time (for example, 100 ms) to move the Z stage to an image pickup position and feeding back the detected position of the Z stage after waiting for a stabilization time period (for example, 30 ms). As a result, it is possible to shorten a control time period for moving the stage and optimize the movement of the stage. Further, feed forward control is performed. Thus, it is possible to shorten a control time period for moving the stage and perform the position control with higher accuracy, with the result that it is possible to optimize the movement of the stage.

According to another embodiment of the present technology, there is provided a stage control method including detecting, for a measurement point preset on a stage that determines a position of a pathology slide in an optical axis direction of an objective lens of an image pickup unit, a position of the stage in the optical axis direction, the pathology slide being an image pickup target of the image pickup unit, and controlling, by using at least a result of the detection, a movement mechanism that is connected to the stage through a connection unit provided to the stage and moves the stage in the optical axis direction.

In the stage control method in the embodiment of the present technology, a movement target position for each unit time may be calculated as a series, the unit time being shorter than a time period necessary to move the stage to an image pickup position where an image of the pathology slide is taken may be calculated, a difference between the movement target position and the position detected may be calculated for each the unit time, and the difference may be converted to a control amount of a stepping motor included in the movement mechanism.

In the stage control method in the embodiment of the present technology, a movement target position for each unit time may be calculated as a series, the unit time being shorter than a time period necessary to move the stage to an image pickup position where an image of the pathology slide is taken may be calculated, a difference between the movement target position and the movement target position in the unit time of a preceding period may be calculated as a first difference for each unit time, the first difference may be converted to a first control amount of a stepping motor included in the movement mechanism, a difference between the movement target position in the unit time n periods (n: predetermined positive integer) before and the position detected may be calculated as a second difference for each the unit time, the second difference may be converted to a second control amount of the stepping motor, and the first control amount and the second control amount may be synthesized and output to the movement mechanism.

As described above, according to the present technology, it is possible to move the stage at a high velocity with high accuracy.

These and other objects, features and advantages of the present technology will become more apparent in light of the following detailed description of best mode embodiments thereof, as illustrated in the accompanying drawings.

DETAILED DESCRIPTION OF EMBODIMENTS

Hereinafter, an embodiment of the present technology will be described with reference to the drawings. It should be noted that in the following, description will be given on divided sections of typical methods and improvement methods therefor.

(Typical Method of Detecting Z Stage Position)

Figure 1:
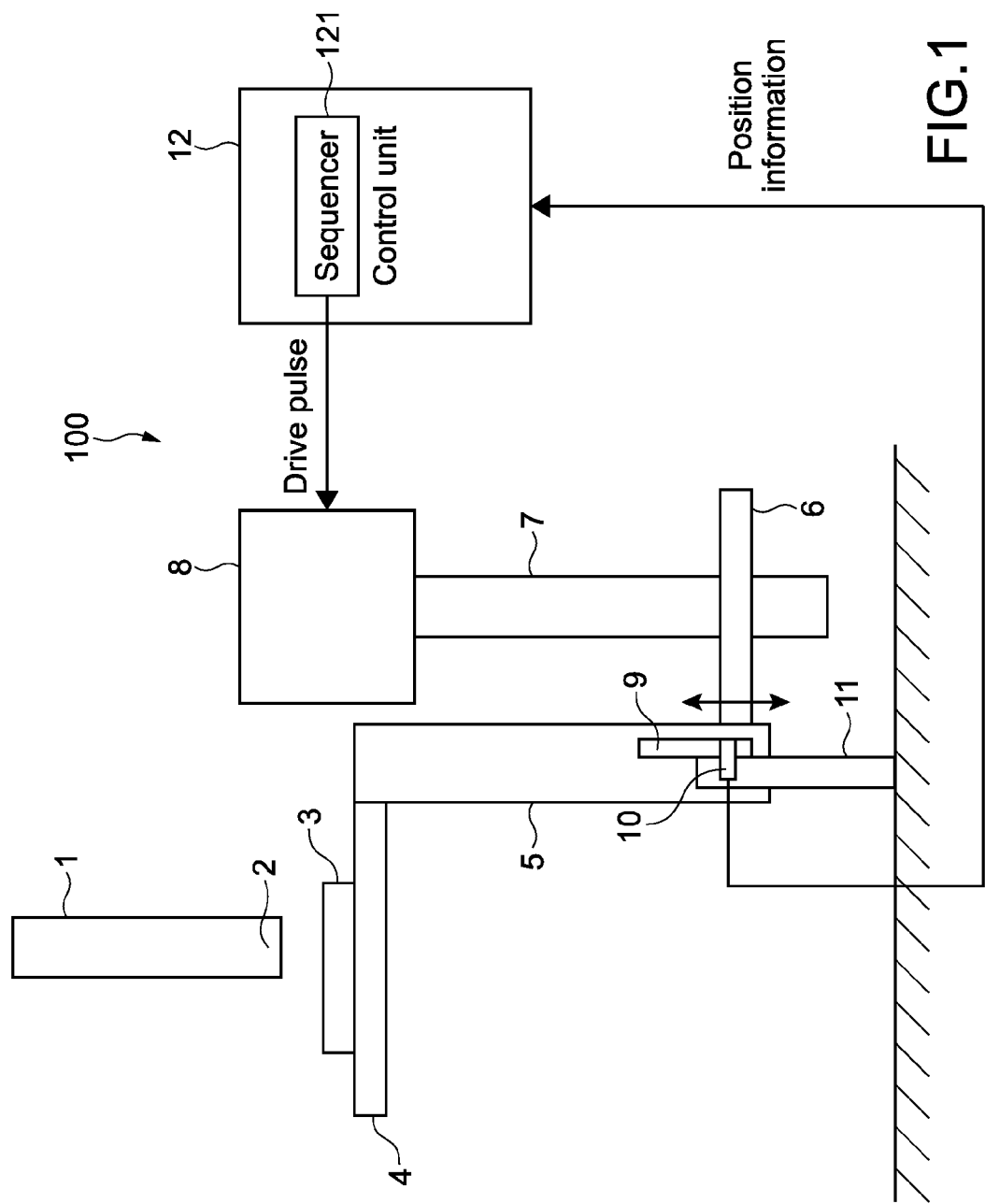
FIG. 1 is a conceptual diagram for explaining a typical method of detecting a position of a Z stage.

First, a typical method of detecting a position of a Z stage will be described. FIG. 1 is a conceptual diagram for explaining a typical method of detecting the position of the Z stage. It should be noted that in the conceptual diagram, members irrelevant to the description in this embodiment are omitted.

A microscope unit 100 of a digital microscope apparatus is provided with a lens tube 1, an objective lens 2, a slide 3, a Z stage 4, a connection unit 5, a feed nut 6, a ball screw 7, a stepping motor 8, an encoder scale 9, an encoder sensor 10, a column 11, a control unit 12, and a sequencer 121.

The lens tube 1, the objective lens 2, and an image pickup element (not shown) constitute an image pickup unit. The feed nut 6, the ball screw 7, and the stepping motor 8 constitute a movement mechanism. The Z stage 4 and the movement mechanism are connected by the connection unit 5. The connection unit 5 is protruded from the Z stage 4 in an optical axis direction of the objective lens 2. The encoder scale 9 and the encoder sensor 10 constitute a position detection unit.

The slide 3 as an image pickup target is placed on an XY stage (not shown) on the Z stage 4, and an image of the slide 3 is taken by the image pickup element through the objective lens 2 provided on a lower end of the lens tube 1. At a time when the image is taken, to perform focusing, the movement of the Z stage 4 in the optical axis direction is performed. The movement is performed by rotating the ball screw 7, which is screwed with the feed nut 6 connected to the Z stage 4 through the connection unit 5, by the stepping motor 8.

The number of rotations of the stepping motor 8 is controlled on the basis of intervals and the number of drive pulses given by the sequencer 121 including hardware constituted of an FPGA (field programmable gate array). The control unit 12 causes the encoder sensor 10 to read the position of the encoder scale 9 attached to the connection unit 5 to obtain position information, calculates the intervals and the number of the drive pulses output to the stepping motor 8 on the basis of the position information thus obtained, and gives a result of the calculation to the sequencer 121.

In the typical method, when the position of the Z stage 4 in the optical axis direction is detected, the encoder scale 9 is disposed on the connection unit 5 in the vicinity of the feed nut 6, and the position of the Z stage 4 is indirectly detected. Therefore, there is a problem in that, when the encoder sensor 10 reads the encoder scale 9 after the Z stage 4 is moved, even if attenuation of vibrations of the connection unit 5 is detected, vibrations of the Z stage 4 on which the slide 3 is placed are still continued. When an image is taken with the slide 3 vibrated, the quality of the image is degraded.

Further, the position of the Z stage 4 is indirectly measured on the basis of the position of the connection unit 5. Therefore, there is a problem in that even if the position read by the encoder sensor 10 is a desired position, an actual position of the Z stage 4 may differ from the desired position.

(Improvement Method of Detecting Position of Z Stage)

Figure 2:
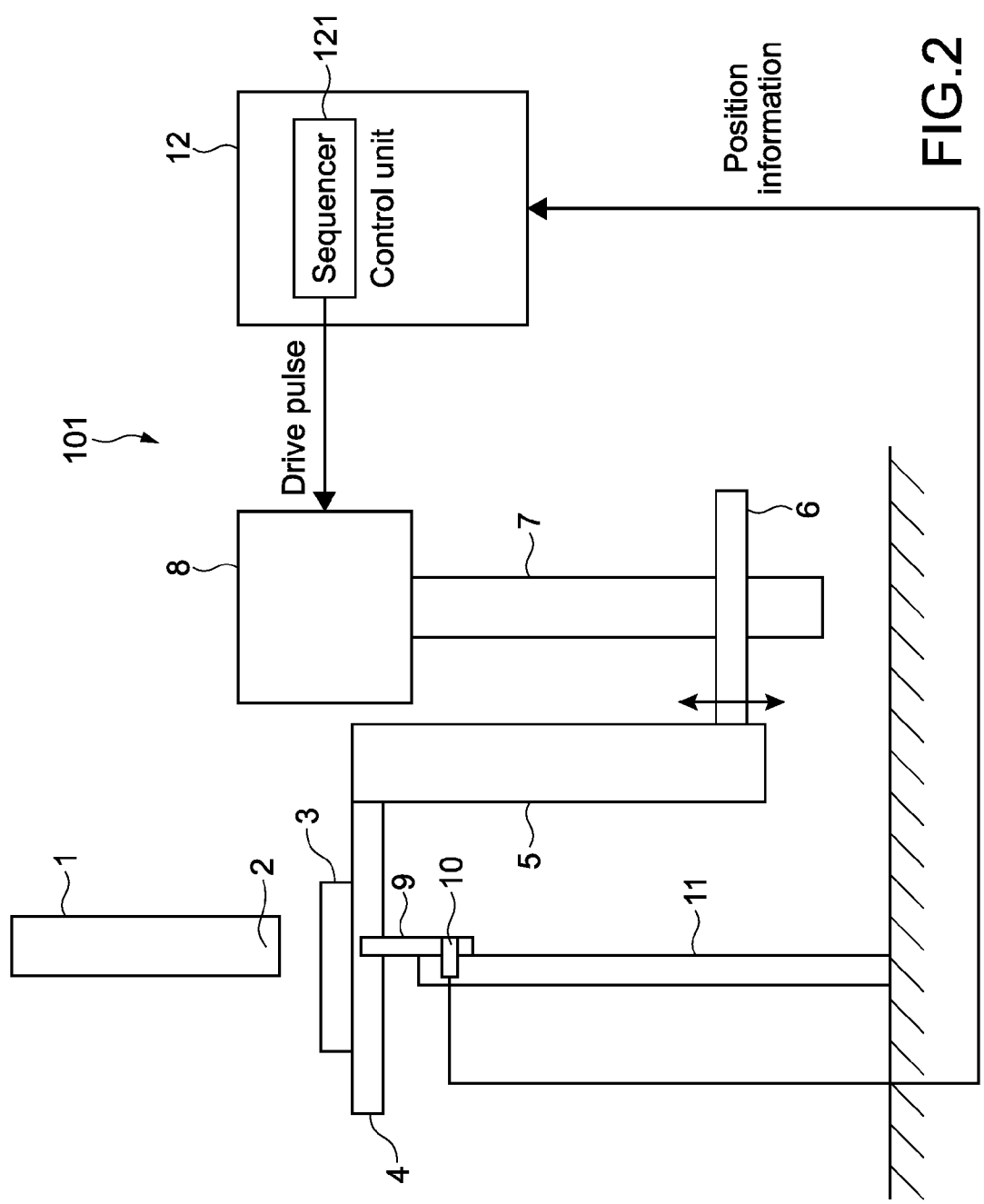
FIG. 2 is a conceptual diagram for explaining an improved method of detecting the position of the Z stage.

Subsequently, an improvement method of detecting the position of the Z stage will be described. FIG. 2 is a conceptual diagram for explaining the improved method of detecting the position of the Z stage. It should be noted that members irrelevant to the description in this embodiment are omitted. Further, the components of a microscope unit 101 of a digital microscope apparatus that uses the improved detection method are the same as the components of the microscope unit 100 of the digital microscope that uses the typical detection method, so description thereof will be omitted.

A difference between the typical detection method and the improved detection method lies in attachment positions of the encoder scale 9 and the encoder sensor 10. In the improved detection method, the encoder scale 9 is provided to the Z stage 4 so as to be close to the slide 3 to be shot as much as possible, thereby directly detecting the position of the Z stage 4.

Therefore, the position of the Z stage 4 read by the encoder sensor 10 coincides with an actual position of the Z stage 4. Further, it is possible to take an image of the slide 3 after confirming that the vibrations of the Z stage 4 and the slide 3 are sufficiently attenuated.

The above is the typical method and the improved method of detecting the position of the Z stage 4.

(Typical Method of Controlling Stepping Motor (1))

Subsequently, a typical open loop control method for the stepping motor 8 will be described.

Figure 3:
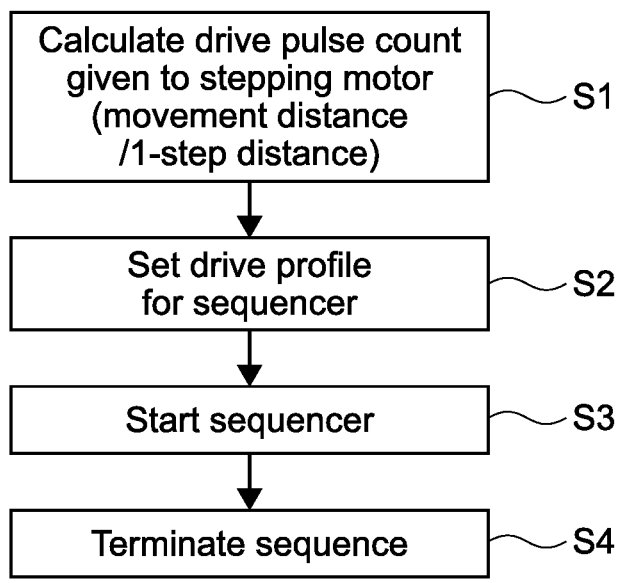
FIG. 3 is a flowchart for explaining a flow of a process of performing a typical open loop control.

The flow of the open loop control is as follows. FIG. 3 is a flowchart for explaining the flow of a process of performing the typical open loop control.

First, from a difference between a current position of the Z stage 4 and a target position (image pickup position) for taking an image, the control unit 12 calculates a distance by which the Z stage 4 has to be moved by the stepping motor 8. On the basis of the distance calculated and a movement distance of the Z stage per drive pulse (per step) given to the stepping motor 8, the control unit 12 calculates a total drive pulse count A to be given to the stepping motor 8, before the stage is moved to the image pickup position (Step S1).

Figures 4, 5:
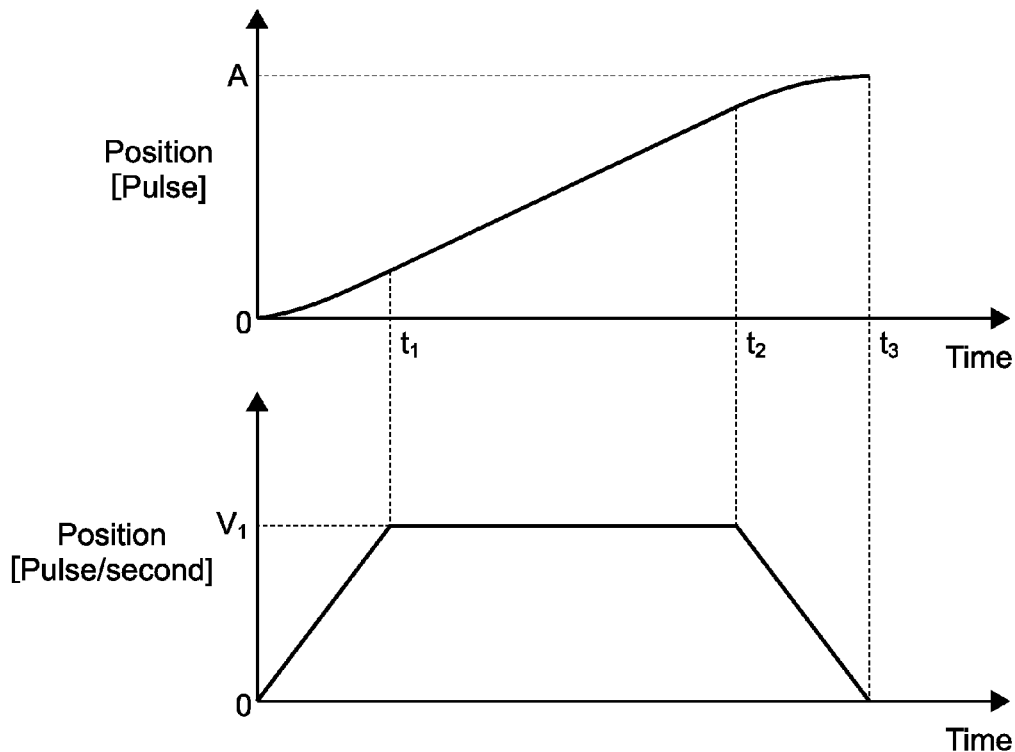
FIG. 4 is a diagram showing a position curve (upper graph) and a velocity curve (lower graph) at the time when the Z stage 4 is moved.
FIG. 5 is a diagram showing an example of a drive profile.

Next, on the basis of the total drive pulse count A calculated in the preceding step, the control unit 12 generates a drive profile of the stepping motor 8 along a position curve and a velocity curve shown in FIG. 4 and sets the drive profile for the sequencer 121 (Step S2).

FIG. 4 is a diagram showing the position curve (upper graph) and the velocity curve (lower graph) at the time when the Z stage 4 is moved. To move the Z stage 4 naturally, from time t=0 to time t=t1, the movement velocity of the Z stage 4 is gradually increased and accelerated as shown in the velocity curve. When the velocity reaches a certain velocity v1, the velocity is maintained till t=t2. From t=t2, the Z stage 4 is started to be decelerated and stopped at t=t3. At a position where the Z stage 4 is stopped, the total drive pulse count reaches A as shown in the position curve.

FIG. 5 is a diagram showing an example of the drive profile. As shown in the figure, the drive profile of the stepping motor 8 shows a table including sets of drive pulse counts and pulse intervals. Initial two pulses are generated at intervals of 10 ms, thereby starting to move the Z stage 4 slowly. The pulse intervals are reduced from 10 ms to 7 ms, 5 ms, and then 3 ms, thereby gradually accelerating the Z stage 4. Then, the pulse intervals are increased again, thereby decelerating and stopping the Z stage 4.

Subsequently, the control unit 12 starts the sequencer 121 for which the drive profile is set. The sequencer 121 outputs actual drive pulses for driving the stepping motor 8 (Step S3).

Figure 6:
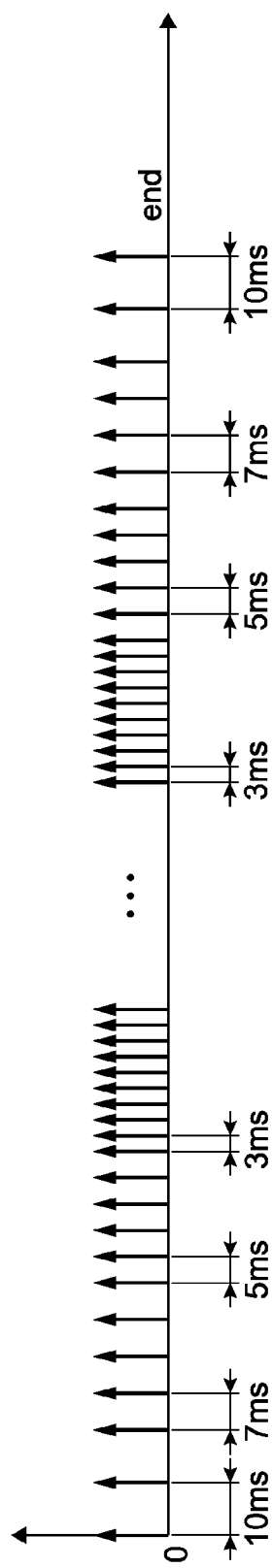
FIG. 6 is a diagram showing a state of the drive pulses actually output from the sequencer 121 on the basis of the drive profile shown in FIG. 5.

FIG. 6 is a diagram showing a state of the drive pulses actually output from the sequencer 121 on the basis of the drive profile shown in FIG. 5. As shown in FIG. 6, the drive pulses output show constant strengths, and intervals thereof are gradually reduced with time and gradually increased again.

Finally, the sequencer 121 terminates the output of the drive pulses set for the drive profile and is stopped (Step S4).

The above is the typical open loop control method for the stepping motor 8.

The typical method has a problem in that, in the case where the distance between the current position of the Z stage 4 and the image pickup position thereof is long, the stage has to be moved by the long distance, and thus the total drive pulse count A becomes large. When the total drive pulse count A becomes large, the table of the drive profile becomes large, and a resource consumption of the sequencer 121 is increased.

(Typical Method of Controlling Stepping Motor (2))

Subsequently, a typical feedback control method of controlling the stepping motor 8 will be described.

In a system that uses the stepping motor, the assumption is made that the movement is performed by a desired distance (angle) from a distance (angle) by which the drive is performed by one drive pulse (step) and a total pulse (step) count given to the stepping motor. However, due to a backlash in a mechanical system, a friction, or the like, the position to which the Z stage is actually moved is not necessarily a desired position.

In view of this, in a system in which positioning has to be performed to a desired position with high accuracy, as will be described in the following, each time a series of sequences is terminated, a control amount of the position or the like of the Z stage 4 is measured by a position detection means such as an encoder, and a shift amount has to be fed back.

Figure 7:
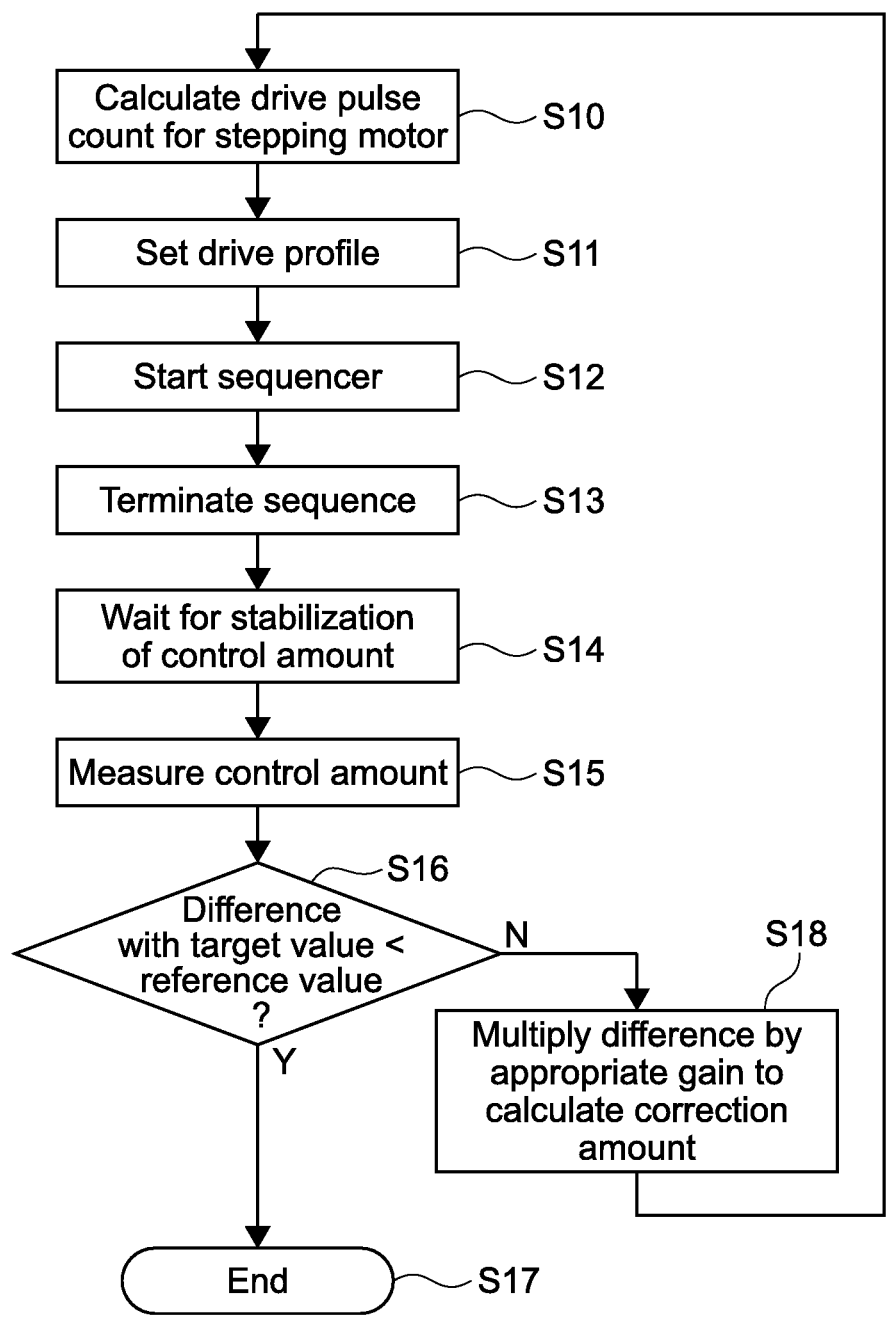
FIG. 7 is a flowchart for explaining a flow of a process of performing typical feedback control.

The flow of the feedback control is as follows. FIG. 7 is a flowchart for explaining the flow of a process of performing typical feedback control.

First, from a difference between a current position of the Z stage 4 and an image pickup position thereof, the control unit 12 calculates a distance by which the Z stage 4 has to be moved by the stepping motor 8. On the basis of the distance calculated and a movement distance of the Z stage per drive pulse (per step) given to the stepping motor 8, the control unit 12 calculates the total drive pulse count A to be given to the stepping motor 8, before the stage is moved to the image pickup position (Step S10).

Next, on the basis of the total drive pulse count A calculated in the preceding step, the control unit 12 generates a drive profile of the stepping motor 8 and sets the drive profile for the sequencer 121 (Step S11).

Then, the control unit 12 starts the sequencer 121 for which the drive profile is set. From the sequencer 121, actual drive pulses for driving the stepping motor 8 are output (Step S12).

Then, the sequencer 121 terminates the output of the drive pulses set for the drive profile and is stopped (Step S13).

Then, the control unit 12 waits for stabilization of the control amount until the vibration of the Z stage 4 is stopped (Step S14).

Then, the control unit 12 uses the encoder scale 9 and the encoder sensor 10 to measure the position of the Z stage 4, that is, measure the control amount (Step S15).

Then, the control unit 12 determines whether a difference between the measured position of the Z stage 4 and the image pickup position is smaller than a predetermined reference value or not (Step S16).

In the case where the difference between the measured position of the Z stage 4 and the image pickup position thereof is smaller than the predetermined reference value, the control unit 12 terminates the control process (Step S17).

In the case where the difference between the measured position of the Z stage 4 and the image pickup position thereof is equal to or larger than the predetermined reference value, the control unit 12 multiplies the difference between the measured position of the Z stage 4 and the image pickup position by an appropriate gain to calculate and feed back a correction amount (Step S18).

After the feedback of the correction amount, the process returns to Step S10, the control unit 12 continues the control process.

The above is the typical feedback control method of controlling the stepping motor 8.

As an example of the actual movement amount and a necessary time period, in the case where the Z stage 4 is moved by 1 mm, for example, it takes approximately 100 ms from when the sequencer 121 is started in Step S12 until the sequence is terminated in Step S13. Further, it takes at least 25 ms to 30 ms in the stabilization waiting in Step S14.

The typical method has a problem in that one feedback loop includes the sequence of the total drive pulses until the Z stage 4 is moved to the image pickup position and the stabilization waiting time period for measuring the control amount. For this reason, when a plurality of feedback loops are carried out, it takes very long time to perform control until the Z stage 4 is moved to the image pickup position.

Further, in the case where the feedback control is performed, the problem as in the case of the open loop control described above remains. If the difference between the current position of the Z stage 4 and the image pickup position is long, the table of the drive profile becomes large, so a resource consumption of the sequencer 121 is increased.

(Improvement Method for Stepping Motor Control (1))

Next, an improvement method for feedback control for the stepping motor will be described. By the feedback control method for the stepping motor to be described below, an excessive resource consumption of the sequencer 121 described above and the long control time period are dramatically improved.

Figure 8:
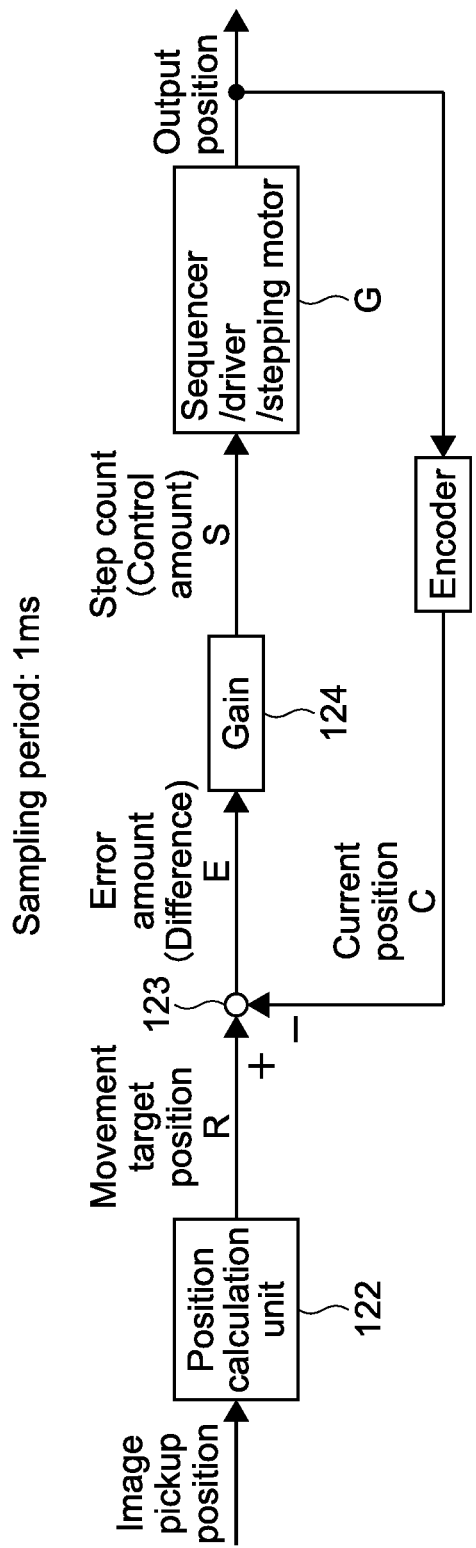
FIG. 8 is a block diagram showing an improvement method for feedback control for a stepping motor.

FIG. 8 is a block diagram showing this control method. The characteristic of this control method lies in that one feedback control is performed a great number of times in a very short period (unit time) of 1 ms, for example, although it takes 130 ms or more for one feedback control in the typical feedback control.

In this control, the control unit 12 is provided with a position calculation unit 122, a difference calculation unit 123, and a conversion unit 124.

To the position calculation unit 122, information relating to the image pickup position, which is a final position to which the Z stage 4 has to be moved, is input. In the position calculation unit 122, a position where the Z stage 4 has to be positioned after a unit time (for example, 1 ms) elapses is calculated as a movement target position R from the input image pickup position.

As the movement target position, only a position after the unit time elapses is not determined, but movement target positions for each unit time until the Z stage reaches the image pickup position are determined as a series. For each unit time, the position calculation unit 122 outputs one movement target position in the unit time to the difference calculation unit 123.

The difference calculation unit 123 calculates, as an error amount E, a difference between the information of the movement target position R and a current position C detected by the encoder sensor 10. The error amount E calculated is output to the conversion unit 124. It should be noted that the difference calculation unit 123 corresponds to an addition point in a general block diagram.

The conversion unit 124 multiplies the input error amount E by a gain G to perform conversion to a step count (control amount) S. The step count S is processed by the sequencer 121, the driver, and the stepping motor 8 in a control target G to move the Z stage 4. The movement position (output position) of the Z stage 4 is converted to the current position C by the encoder sensor 10 and then fed back to the difference calculation unit 123.

In the control method, only a necessary step count for each unit time (for example, 1 ms) is calculated, and only a necessary drive profile during each unit time is set for the sequencer 121. Therefore, it is possible to prevent the hardware resource constituted of the FPGA included in the sequencer 121 from being excessively consumed.

As a specific example of the drive profile, for example, in the case where five steps are necessary as the step count of the calculation result, the drive profile for outputting five drive pulses every 200 µm only has to be generated and set with the unit time of 1 ms divided into five.

The control unit 12 monitors the error amount E for each unit time (for example, 1 ms). When the error amount E becomes continuously equal to or less than a reference value for a certain time period (for example, 25 ms, that is, during 25 rotations of the feedback loop), the control unit 12 determines that the error amount E falls with in a convergence range and terminates the control process.

It should be noted that a result of multiplying the error amount E by the gain G in the conversion unit 124 indicates a value with decimals, but the step count S has to be obtained as an integer. In view of this, in the conversion unit 124, it is necessary to provide software for reducing a truncated error of a decimal part by Δ modulation or the like.

Figure 9:
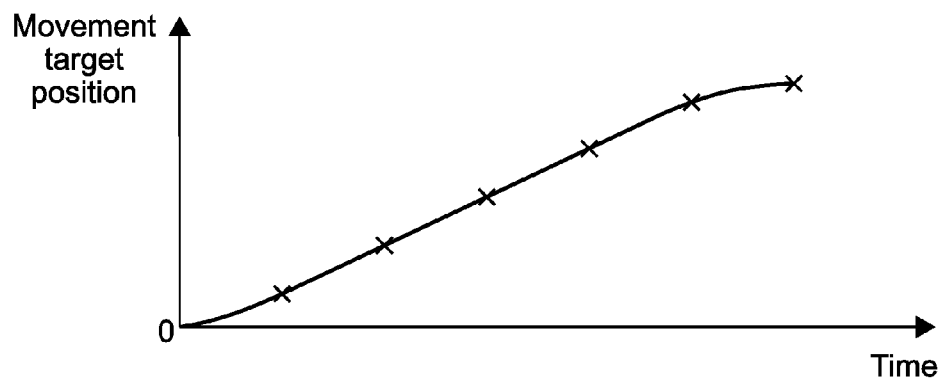
FIG. 9 is a diagram showing a state in which a movement target position R is given as a smooth curve of a time function.
Figure 10:
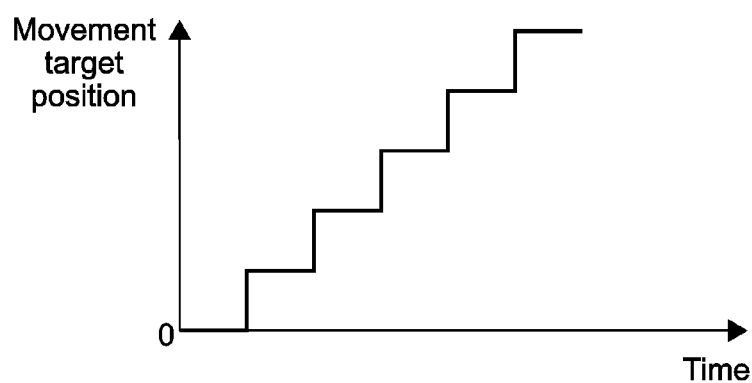
FIG. 10 is a diagram showing a state in which the movement target position R is given as a function in a step form.

It should be noted that the movement target position calculated by the position calculation unit 122 may be given as a smooth curve of a time function as shown in FIG. 9 or given as a function in a step form as shown in FIG. 10.

In the control method, instead of providing a stabilization time period before measuring the control amount, the feedback control is performed a great number of times in the very short period, thereby making it possible to converge the error of the position measurement due to the vibrations of the Z stage 4.

Figure 11:
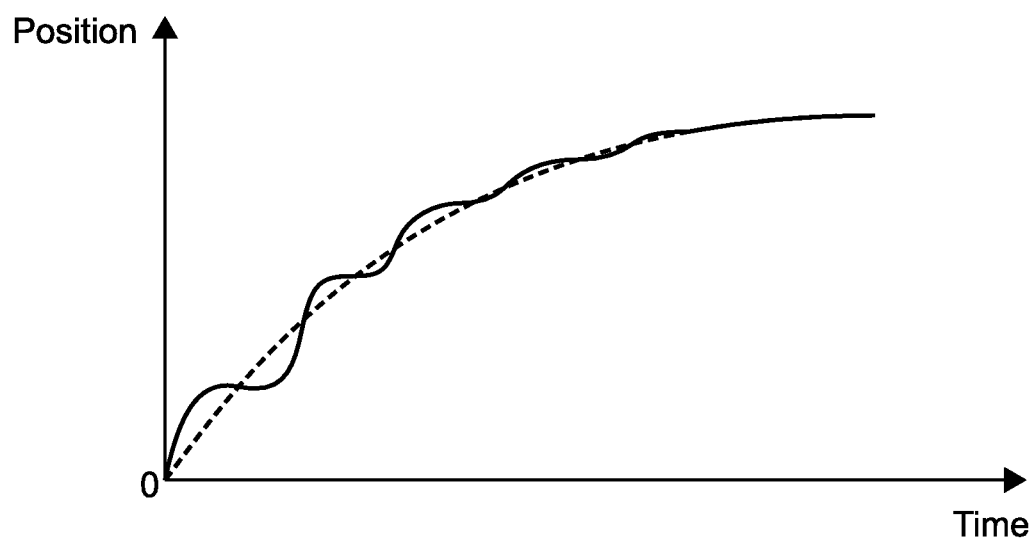
FIG. 11 is an image diagram showing a state in which vibrations are converged by performing the feedback control a great number of times in a very short period.

FIG. 11 is an image diagram showing a state in which the vibrations are converged by performing the feedback control a great number of times in the very short period. In the figure, the solid line vibrated indicates the actual position of the Z stage 4, and a smooth dotted line indicates the movement target position R.

The above is the method of improving the feedback control of the stepping motor.

(Improvement Method for Stepping Motor Control (2))

Next, a further improvement method for the stepping motor control will be described. By the stepping motor control method to be described below, an excessive resource consumption of the sequencer 121 and a long control time period are dramatically improved.

Figure 12:
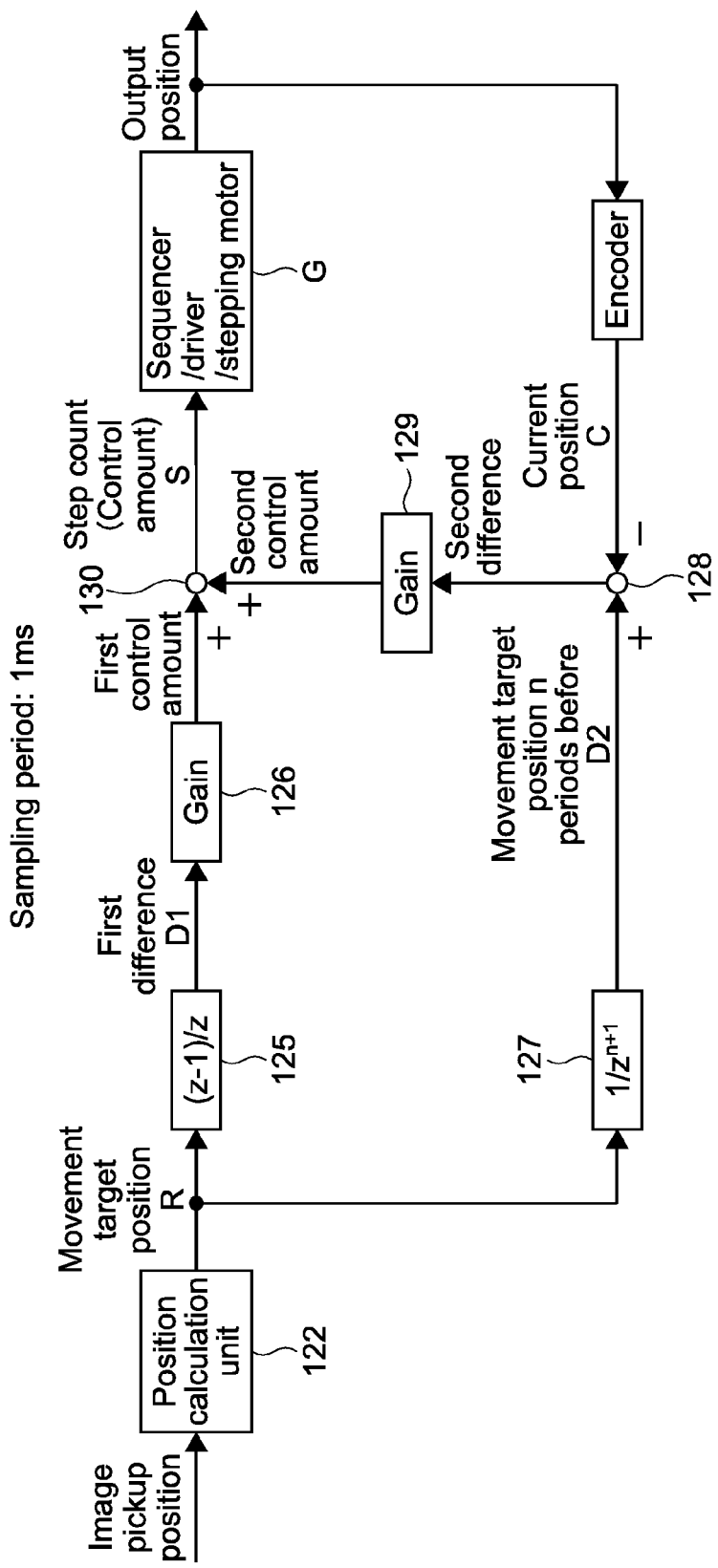
FIG. 12 is a block diagram showing a control method by using two degree-of-freedom control.

FIG. 12 is a block diagram showing this control method. The characteristic of this control method lies in performing two degree-of-freedom control including feed-forward control in addition to performing one feedback control a great number of times in a very short period (unit time) of 1 ms, for example, like the improvement method described above. Thus, it is possible to achieve the control at higher speed with higher accuracy as compared to the improvement method of performing only the feedback control.

In the control method, in the control target G, a transmission characteristic from when the step count S is input until the movement position (output position) of the Z stage 4 is output is a first-order integral characteristic and is a discrete system. Therefore, the method is based on the fact that a transfer function at a time of performing Laplace transform can be simply modeled to be $1/(z-1)$. z represents a delay operator.

Further, in the control system, a delay in the control of several periods is expected, so the transfer function can be represented by $1/(z-1)/z^n$. n represents 0 or more integer, and such a value as to optimizing a response of the control system may be experimentally selected therefor.

In the control, the control unit 12 is provided with the position calculation unit 122, a first difference calculation unit 125, a first conversion unit 126, a delay operation unit 127, a second difference calculation unit 128, a second conversion unit 129, and a synthesis unit 130.

The function of the position calculation unit 122 is the same as that in the improvement method of the feedback control described above, so description thereof will be omitted.

The first difference calculation unit 125 calculates, as a first difference D1, a difference between the current movement target position in the unit time and a movement target position in the unit time of a preceding period and outputs the first difference D1 to the first conversion unit 126. A transfer function in the first difference calculation unit 125 is represented by $(z-1)/z$.

The first conversion unit 126 multiplies the first difference D1 obtained from the first difference calculation unit 125 by an appropriate gain, converts a value obtained into a first control amount (step count) for driving the stepping motor 8, and outputs the first control amount to the synthesis unit 130.

The delay operation unit 127 delays a signal of the movement target position R, which is an output from the position calculation unit 122, and outputs a movement target position D2 in the unit time n periods before to the second difference calculation unit 127. A transfer function of the delay operation in the delay operation unit 127 is represented by $1/z\,(n+1)$.

The second difference calculation unit 128 calculates, as a second difference, a difference between the movement target position D2 in the unit time n periods before output from the delay operation unit 127 and the current position C detected by the encoder sensor 10. The second difference calculated is output to the second conversion unit 129.

The second conversion unit 129 multiplies the second difference obtained from the second difference calculation unit 128 by an appropriate gain, converts a value obtained to a second control amount (step count) for driving the stepping motor 8, and outputs the second control amount to the synthesis unit 130.

The synthesis unit 130 synthesizes the first control amount output from the first conversion unit 126 and the second control amount output from the second conversion unit 129 to generate a step count for actually driving the stepping motor 8 included in the movement mechanism. The step count generated is output to the control target G.

Figure 13:
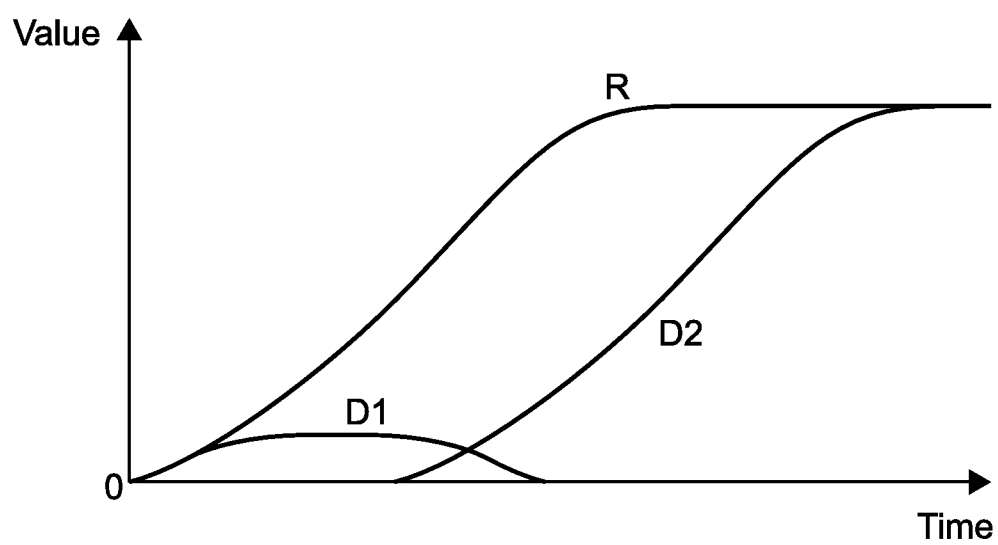
FIG. 13 is an image diagram showing the relationship among the movement target position R in the unit time, a first difference D1, which is a difference between a current movement target position in the unit time and a movement target position in the unit time of a preceding period, and a movement target position D2 in the unit time n periods before, which is a delay operation result in a delay operation unit.

FIG. 13 is an image diagram showing the relationship among the movement target position R in the unit time (for example, 1 ms), the first difference D1, which is the difference between the current movement target position in the unit time and the movement target position in the unit time of a preceding period, and the movement target position D2 in the unit time n periods before, which is a delay operation result in the delay operation unit 127.

The above is the method of further improving the stepping motor control by using the two degree-of-freedom control.

(Improvement Method for Stepping Motor Control (3))

Next, an improvement method for the stepping motor control by using open loop control will be described. By the stepping motor control method to be described below, an excessive resource consumption of the sequencer 121 is dramatically improved.

Figure 14:
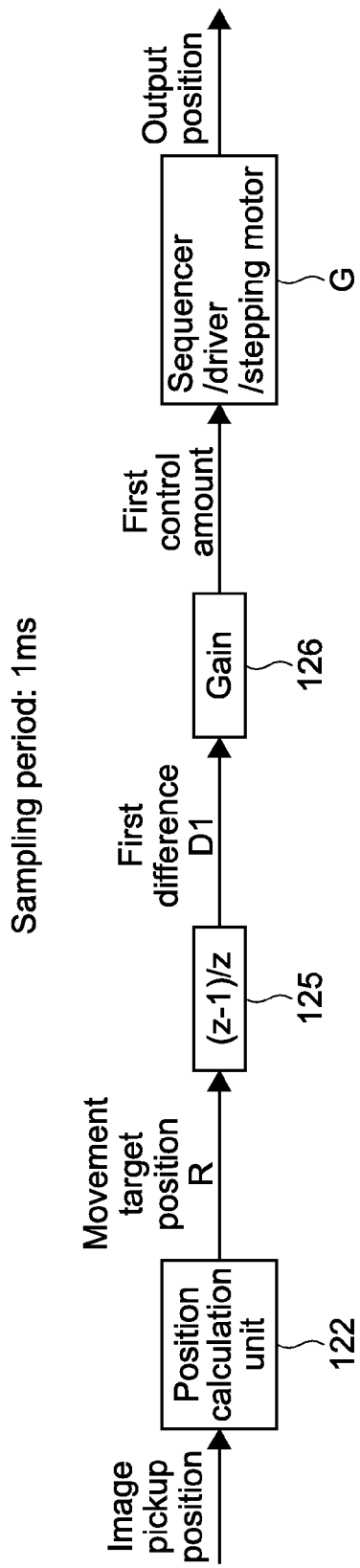
FIG. 14 is a block diagram showing an improvement method for stepping motor control by open loop control.

FIG. 14 is a block diagram showing this control method. The characteristic of this control method lies in that one feedback control is performed a great number of times in a very short period (unit time) of 1 ms, for example, as in the improvement method described above.

In the case where there is no problem if the position to which the Z stage 4 is actually moved is slightly different from a desired position due to a backlash in a mechanical system, a friction, or the like, it is possible to perform the open loop control without the feedback part, that is, the encoder scale 9 and the encoder sensor 10.

The control method is different from the typical open loop control method in that not the total drive pulse count A to the image pickup position but a movement distance toward the movement target position R after the unit time (for example, 1 ms) elapses is set to the sequencer 121 as the drive profile. Thus, it is possible to suppress a resource consumption of the hardware constituted of the FPGA of the sequencer 121.

In the control, the control unit 12 is provided with the position calculation unit 122, the first difference calculation unit 125, and the first conversion unit 126. The functions of the position calculation unit 122, the first difference calculation unit 125, and the first conversion unit 126 are the same as those in the control method by using the two degree-of-freedom control described above, so description of those units will be omitted.

In the control system, in the first difference calculation unit 125, the first difference D1, which is the difference between the current movement target position in the unit time and the movement target position in the unit time of a preceding period, is calculated, and in the first conversion unit 126, the first difference D1 is converted to the first control amount (step count). The first control amount (step count) converted is input to the control target G, and the movement of the Z stage 4 is performed. That is, the control system can be mounted only by mounting the position calculation unit 122, the first difference calculation unit 125, and the first conversion unit 126, so it is possible to cut the manufacturing cost.

The above is the method of improving the stepping motor control by the open loop control.

(Supplemental Matter)

In addition, the present technology is not limited to the above embodiment and can of course be variously modified without departing from the gist of the present technology.

(Another Structure of Present Technology)

It should be noted that the present technology can take the following configurations.

(1) An image obtaining apparatus, comprising:
an image pickup unit including an objective lens;
a stage configured to determine a position of a pathology slide in an optical axis direction of the objective lens, the pathology slide being an image pickup target of the image pickup unit;
a connection unit provided to the stage;
a movement mechanism connected to the stage through the connection unit and configured to move the stage in the optical axis direction;
a position detection unit configured to detect a position of the stage in the optical axis direction for a measurement point preset on the stage; and
a control unit configured to control the movement mechanism by using at least a result of the detection by the position detection unit.

(2) The image obtaining apparatus according to Item (1), in which
the connection unit is protruded from the stage in the optical axis direction.

(3) The image obtaining apparatus according to Item (1) or (2), in which
the movement mechanism includes a stepping motor, and
the control unit includes
a position calculation unit configured to calculate a movement target position for each unit time as a series, which is shorter than a time period necessary to move the stage to an image pickup position where an image of the pathology slide is taken,
a difference calculation unit configured to calculate a difference between the movement target position and the position detected by the position detection unit for each the unit time, and
a conversion unit configured to convert the difference to a control amount of the stepping motor.

(4) The image obtaining apparatus according to Item (1) or (2), in which
the movement mechanism includes a stepping motor, and
the control unit includes
a position calculation unit configured to calculate a movement target position for each unit time as a series, which is shorter than a time period necessary to move the stage to an image pickup position where an image of the pathology slide is taken,
a first difference calculation unit configured to calculate, as a first difference, a difference between the movement target position and the movement target position in the unit time of a preceding period for each the unit time,
a first conversion unit configured to convert the first difference to a first control amount of the stepping motor,
a second difference calculation unit configured to calculate, as a second difference, a difference between the movement target position in the unit time n periods (n: predetermined positive integer) before and the position detected by the position detection unit for each the unit time,
a second conversion unit configured to convert the second difference to a second control amount of the stepping motor, and
a synthesis unit configured to synthesize the first control amount and the second control amount to output a synthesized control amount to the movement mechanism.

(5) A stage control method, comprising:
detecting, for a measurement point preset on a stage that determines a position of a pathology slide in an optical axis direction of an objective lens of an image pickup unit, a position of the stage in the optical axis direction, the pathology slide being an image pickup target of the image pickup unit; and
controlling, by using at least a result of the detection, a movement mechanism that is connected to the stage through a connection unit provided to the stage and moves the stage in the optical axis direction.

(6) The stage control method according to Item (5), in which
a movement target position for each unit time is calculated as a series, the unit time being shorter than a time period necessary to move the stage to an image pickup position where an image of the pathology slide is taken,
a difference between the movement target position and the position detected is calculated for each the unit time, and
the difference is converted to a control amount of a stepping motor included in the movement mechanism.

(7) The stage control method according to Item (5), in which
a movement target position for each unit time is calculated as a series, the unit time being shorter than a time period necessary to move the stage to an image pickup position where an image of the pathology slide is taken,
a difference between the movement target position and the movement target position in the unit time of a preceding period is calculated as a first difference for each the unit time,
the first difference is converted to a first control amount of a stepping motor included in the movement mechanism,
a difference between the movement target position in the unit time n periods (n: predetermined positive integer) before and the position detected is calculated as a second difference for each the unit time,
the second difference is converted to a second control amount of the stepping motor, and
the first control amount and the second control amount is synthesized and output to the movement mechanism.

It should be understood by those skilled in the art that various modifications, combinations, sub-combinations and alterations may occur depending on design requirements and other factors insofar as they are within the scope of the appended claims or the equivalents thereof.

What is claimed is:

1. An image obtaining apparatus, comprising:
an image pickup unit including an objective lens;
a stage configured to position a pathology slide with respect to the image pickup unit and in a direction of an optical axis of the objective lens;
a connection unit coupled to the stage;
a movement mechanism including a stepper motor, wherein the movement mechanism is coupled to the connection unit and configured to move the stage in the optical axis direction;
a position detection unit configured to detect a current position of the stage in the optical axis direction; and
a control unit configured to:
calculate a plurality of target positions including a first target position, a second target position, and a third target position, each target position of the plurality of target positions corresponding to a different unit of time in a series, wherein each unit of time is less than a period of time to move the stage from an initial starting position to a final image pickup position where an image of the pathology slide is taken,
calculate a first difference between the first target position for a first unit of time in the series and the second target position for a second unit of time in the series, wherein the second unit of time in the series precedes the first unit of time in the series,
convert the first difference to a first control amount,
calculate a second difference between the third target position for a third unit of time in the series and the current position of the stage in the optical axis direction as detected by the position detection unit, wherein the third unit of time in the series precedes the first unit of time in the series by n units of time, and wherein n is a positive integer greater than two,
convert the second difference to a second control amount,
synthesize the first control amount and the second control amount to determine a third control amount, and
output one or more drive pulses to the stepper motor based on the third control amount,
wherein the image pickup unit acquires an image of the pathology slide at the final image pickup position.

2. The image obtaining apparatus according to claim 1, wherein the connection unit protrudes from the stage in the optical axis direction.

3. A stage control method, comprising:
detecting a current position of a stage in an optical axis direction of an objective lens of an image pickup unit;
calculating a plurality of target positions including a first target position, a second target position, and a third target position, each target position of the plurality of target positions corresponding to a different unit of time in a series, wherein each unit of time is less than a time period to move the stage from an initial starting position to a final image pickup position for an image of a pathology slide;
calculating a first difference between the first target position for a first unit of time in the series and the second target position for a second unit of time in the series, wherein the second unit of time in the series precedes the first unit of time in the series;
converting the first difference to a first control amount;
calculating a second difference between the third target position for a third unit of time in the series and the current position of the stage in the optical axis direction as detected by the position detection unit, wherein the third unit of time in the series precedes the first unit of time in the series by n units of time, and wherein n is a positive integer greater than two;
converting the second difference to a second control amount;
synthesizing the first control amount and the second control amount to determine a third control amount; and
outputting one or more drive pulses based on the third control amount to a stepper motor coupled to the stage thereby moving the stage in the optical axis direction of the objective lens.

4. An image obtaining apparatus, comprising:
an image pickup unit that includes an objective lens;
a stage that positions a pathology slide with respect to the image pickup unit and in a direction of an optical axis of the objective lens;
a connection unit coupled to the stage;
a movement mechanism including a stepper motor, wherein the movement mechanism is coupled to the connection unit and moves the stage in the optical axis direction;
a position detection unit that detects a current position of the stage in the optical axis direction;
a control unit that:
calculates a plurality of target positions including a first target position, a second target position, and a third target position, each target position of the plurality of target positions corresponding to a different unit of time in a series, wherein each unit of time is less than a period of time to move the stage from an initial starting position to a final image pickup position where an image of the pathology slide is taken,
calculates a first difference between the first target position for a first unit of time in the series and the second target position for a second unit of time in the series, wherein the second unit of time in the series precedes the first unit of time in the series,
converts the first difference to a first control amount,
calculates a second difference between a third target position for a third unit of time in the series and the current position of the stage in the optical axis direction as detected by the position detection unit, wherein the third unit of time in the series precedes the first unit of time in the series by n units of time, and wherein n is a positive integer greater than two,
converts the second difference to a second control amount, and
synthesizes the first control amount and the second control amount to determine a third control amount; and
a sequencer that outputs one or more drive pulses to the stepper motor based on the third control amount,
wherein the image pickup unit acquires an image of the pathology slide at the final image pickup position.

5. The image obtaining apparatus according to claim 4, wherein the connection unit protrudes from the stage in the optical axis direction.

* * * * *